United States Patent
Kossira et al.

(10) Patent No.: US 8,983,728 B2
(45) Date of Patent: Mar. 17, 2015

(54) MOTOR VEHICLE WITH CONTROL OF REAR-WHEEL STEERING

(75) Inventors: Christoph Kossira, Ingolstadt (DE); Hugo Müller, Rohrenfels-Ballersdorf (DE); Ulrich Voll, München (DE)

(73) Assignee: Audi AG, Ingolstadt (DE)

( * ) Notice: Subject to any disclaimer, the term of this patent is extended or adjusted under 35 U.S.C. 154(b) by 281 days.

(21) Appl. No.: 13/588,784

(22) Filed: Aug. 17, 2012

(65) Prior Publication Data

US 2013/0054092 A1    Feb. 28, 2013

(30) Foreign Application Priority Data

Aug. 23, 2011   (DE) .......................... 10 2011 111 420

(51) Int. Cl.
| | |
|---|---|
| B62D 6/00 | (2006.01) |
| B62D 7/14 | (2006.01) |
| B62D 7/15 | (2006.01) |
| B62D 6/02 | (2006.01) |

(52) U.S. Cl.
CPC .............. *B62D 7/159* (2013.01); *B62D 7/1509* (2013.01); *B62D 6/002* (2013.01); *B62D 6/02* (2013.01)
USPC .............................................. 701/42; 701/41

(58) Field of Classification Search
CPC ............... B62D 5/06; B62D 6/00; B62D 6/02
USPC ................................................ 701/41, 42, 44
See application file for complete search history.

(56) References Cited

U.S. PATENT DOCUMENTS

| | | | | |
|---|---|---|---|---|
| 4,552,239 A | * | 11/1985 | Kanazawa et al. | 180/408 |
| 4,705,135 A | * | 11/1987 | Kawamoto et al. | 701/41 |
| 4,720,790 A | * | 1/1988 | Miki et al. | 701/41 |
| 4,828,064 A | | 5/1989 | Furutani et al. | |
| 4,947,326 A | * | 8/1990 | Mori et al. | 701/42 |
| 5,003,480 A | * | 3/1991 | Mori et al. | 701/42 |
| 5,019,982 A | * | 5/1991 | Furukawa | 701/41 |
| 5,365,440 A | * | 11/1994 | Abe et al. | 701/41 |

(Continued)

FOREIGN PATENT DOCUMENTS

| | | |
|---|---|---|
| CN | 1150568 | 5/1997 |
| CN | 101535853 | 9/2009 |

(Continued)

OTHER PUBLICATIONS

DE102007037765A1 Translation, Meitinger et al, Feb. 19, 2009, espacenet.com.*

*Primary Examiner* — Tuan C. To
*Assistant Examiner* — Dale W Hilgendorf
(74) *Attorney, Agent, or Firm* — Henry M. Feiereisen LLC

(57) ABSTRACT

A motor vehicle includes a steering wheel for steering front wheels of the motor vehicle, an actuator for automatically steering rear wheels of the motor vehicle, and a control device storing at least two different characteristic curve fields relating to the position of the rear wheels in relation to the position of the front wheels for controlling the actuator. The control device selects one of the two characteristic curve fields depending on a parameter relating to the position of the steering wheel or a change in the position of the steering wheel. When driving the motor vehicle in reverse, the actuator reversibly and continuously adjusts the rear wheels between a steering position that is identical to a steering position of the front wheels and a steering position that is opposite to the steering position of the front wheels.

28 Claims, 3 Drawing Sheets

(56) References Cited

U.S. PATENT DOCUMENTS

| | | | |
|---|---|---|---|
| 6,076,033 A | 6/2000 | Hamada et al. | |
| 6,164,406 A * | 12/2000 | Diekhans et al. | 701/41 |
| 6,859,713 B2 * | 2/2005 | Pallot | 701/41 |
| 7,357,215 B2 * | 4/2008 | Nakashima | 701/41 |
| 7,606,645 B2 * | 10/2009 | Williston et al. | 701/41 |
| 2011/0087405 A1 | 4/2011 | Moshchuk | |
| 2011/0106382 A1 | 5/2011 | Kageyama | |

FOREIGN PATENT DOCUMENTS

| | | |
|---|---|---|
| CN | 102105342 | 6/2011 |
| DE | 35 20 225 A1 | 12/1985 |
| DE | 39 41 464 A1 | 7/1990 |
| DE | 102007037765 A1 * | 2/2009 |
| DE | 102008004159 A1 | 8/2009 |
| DE | 102007037765 B4 | 8/2010 |
| JP | 02-220976 | 4/1990 |

* cited by examiner

MOTOR VEHICLE WITH CONTROL OF REAR-WHEEL STEERING

CROSS-REFERENCES TO RELATED APPLICATIONS

This application claims the priority of German Patent Application, Serial No. 10 2011 111 420.7, filed Aug. 23, 2011, pursuant to 35 U.S.C. 119(a)-(d), the content of which is incorporated herein by reference in its entirety as if fully set forth herein.

BACKGROUND OF THE INVENTION

The present invention relates to a motor vehicle having front wheels which are steerable via a steering wheel and rear wheels which are automatically steerable via an actuator.

The following discussion of related art is provided to assist the reader in understanding the advantages of the invention, and is not to be construed as an admission that this related art is prior art to this invention.

When driving in reverse, a driver often has difficulties to handle or control a motor vehicle which only has a steerable front axle, because this situation essentially corresponds to rear wheel steering when driving in reverse. This causes an unstable driving behavior for the driver, because the motor vehicle immediately travels sideways for even a small excursion of the front wheels. This frequently results in a pendulum motion which it is difficult to collect by counter-steering. The difficulty of driving in reverse is mostly caused by the widely pivoting part of the vehicle and the fact that the driver is typically unable to anticipate the path of the rear wheels based on the excursion of the front wheels.

In some conventional application, the rear wheels are steered based on a characteristic curve field, wherein in a steering angle interval between 0° and a predetermined limit angle, the rear wheels are first adjusted to increase with increasing steering angle from a zero position in the same direction until reaching a maximum excursion and are adjusted, after having reached the limit angle, to decrease until reaching the zero position, and are adjusted in the steering angle interval between the predetermined limit angle and the maximum steering angle to again increase in the opposite direction until the maximum excursion is reached.

The proportionality factor which is stored in the employed characteristic curve field and which indicates the position of the rear wheels in relation to the front wheels while steering from the left limit stop to the right limit stop, or vice versa, includes a transition from a position of the rear wheels in relation to the front wheels from an opposite direction to an identical direction and then again to an opposite direction. In this maneuver, the rear wheels tend to "flutter", in particular at a low constant speed. The subjective driving experience is not satisfactory.

It would therefore be desirable and advantageous to obviate prior art shortcomings and to provide a motor vehicle with an improved driving behavior when driving in reverse.

SUMMARY OF THE INVENTION

According to one aspect of the present invention, a motor vehicle includes a steering wheel for steering front wheels of the motor vehicle, an actuator for automatically steering rear wheels of the motor vehicle, and a control device storing at least two different characteristic curve fields relating to the position of the rear wheels in relation to the position of the front wheels for controlling the actuator. The control device selects one of the two characteristic curve fields depending on a parameter relating to the position of the steering wheel or a change in the position of the steering wheel. When driving the motor vehicle in reverse, the actuator reversibly and continuously adjusts the rear wheels between a steering position that is identical to a steering position of the front wheels and a steering position that is opposite to the steering position of the front wheels.

According to an advantageous feature of the present invention, a characteristic curve field may include, for example, at least one proportionality factor relating to the position of the rear wheels in relation to the position of the front wheels depending on the steering wheel rotation angle and the vehicle speed, wherein negative values of the proportionality factor indicate a position of the rear wheels in relation to the front fields in the opposite direction and positive values of the proportionality factor indicate an identical position of the rear wheels in relation to the front wheels. Typically, a characteristic curve field is to be understood as a three-dimensional table of values of the proportionality factor as a function of the steering wheel rotation angle and the vehicle speed (when driving in reverse). The characteristic curve field therefore includes all parameters required for controlling the actuator so as to automatically adjust the steerable rear wheels for different operating and driving conditions of the motor vehicle.

According to an advantageous feature of the present invention, the control device may be configured to select a corresponding characteristic curve field depending on at least one parameter relating to the position and/or the change in position of the steering wheel. A corresponding characteristic curve fields may therefore be selected based on the actual driving and/or operating situation of the motor vehicle commensurate with the situation, so that different characteristic curve fields are selected for different driving and/or operating situations and used for controlling the actuator.

According to an advantageous feature of the present invention, a characteristic curve field may be selected depending on a parameter relating to the position of the steering wheel. This is essentially to be understood as the steering wheel angle and qualitatively or quantitatively describes the adjustment of the steering wheel in relation to a reference position, which typically, but not necessarily, corresponds to the zero position wherein the front wheels are aligned parallel to the vehicle axis. The position and/or excursion of the front wheels can thus also be inferred from the parameter relating to the position of the steering wheel depending on the respective gear ratio between the steering wheel and the front wheels.

Alternatively, the control device may advantageously take into account a parameter relating to the change in position of the steering wheel when selecting a characteristic curve field suitable for driving in reverse to control the actuator for automatically steering the steerable rear wheels. The change in position refers particularly to the temporal change of the steering wheel rotation angle, i.e. to the steering wheel rotation angle velocity. This measures the speed with which the steering wheel is turned. The steering wheel is typically turned by the driver with a corresponding steering wheel operation; however, steering wheel rotation angle velocities generated, for example, by a driver assist system for automatic parking in reverse may also be measured and taken into consideration.

According to another advantageous feature of the present invention, a parameter relating to the position of the steering wheel as well as the change in position of the steering wheel may also be used. In this way, a corresponding characteristic curve field can be selected based on a comprehensive consideration of all important parameters relating to the steering wheel.

Advantageously, limit values or limit value ranges may be defined for all parameters, wherein a corresponding characteristic curve field is selected when the parameters reach, exceed, or fall below the limit values or fall, outside the limit value ranges.

As mentioned above, the parameter is preferably a limit value for the temporal change of the steering wheel rotation angle and/or the temporal change of the steering wheel rotation angle velocity. Advantageously, the steering wheel rotation angle and the steering wheel rotation angle velocity, respectively, may be measured continuously or intermittently, so that the steering movements can be measured with high resolution and used for selecting a characteristic curve field.

According to another advantageous feature of the present invention, the steering device may be configured for selecting and using a first characteristic curve field, wherein the steering wheel rotation angle resides for a predetermined duration, in particular at least 1000 ms, in a predetermined steering wheel rotation angle range, in particular between 0°±10°, and the steering wheel rotation angle velocity during the predetermined duration does not exceed a steering wheel rotation angle limit velocity, in particular of 100°/s. The first characteristic curve field may thus be selected to be less than a predetermined steering wheel rotation angle limit velocity, when the steering wheel rotation angle is unchanged over a predetermined duration or changes only slightly when taking into account a tolerance range within a steering wheel rotation angle range or rotation angle interval, as well as to be less than a predetermined steering wheel rotation angle limit velocity when a steering wheel rotation angle velocity is kept constant.

The duration may be, for example, 1000 ms, but may in special situations also be smaller or greater. The same applies for the exemplary steering wheel rotation angle range of 0°±10° and/or the steering wheel rotation angle limit velocity of 100°/s.

According to an advantageous feature of the present invention, the first characteristic curve field may have, for example, in a range up to a vehicle limit speed, in particular of 10 km/h, a transition between two maximum steering wheel rotation limit angles, in particular of ±300°, from a negative proportionality factor indicating a position of the rear wheels opposite in relation to the position of the front wheels to a positive proportionality factor indicating a position of the rear wheels identical in relation to the position of the front wheels, and then again to a negative proportionality factor indicating a position of the rear wheels opposite in relation to the position of the front wheels. The first characteristic curve field therefore corresponds substantially to a conventional characteristic curve field, but is according to the invention not normally selected and is used exclusively in specific situations, as described above According to an advantageous feature of the present invention, the course of the proportionality factor in the first characteristic curve field may have up to a vehicle limit speed at least two zero crossings between the two maximum steering wheel rotation limit angles, in which the position of the rear wheels in relation to the front wheels changes from the same direction to the opposite direction, or vice versa, wherein the two zero crossings may advantageously be located at steering wheel rotation angles in a range from 90° to 135°, preferably at ±110°. However, in special situations the zero crossings may also be located at other steering wheel rotation angles.

According to an advantageous feature of the present invention, the control device may select and use a second characteristic curve field when the steering wheel rotation angle is greater than a predetermined steering wheel rotation angle, in particular ±130°. The first and the second characteristic curve fields do not differ from each other above the predetermined steering wheel rotation angle. Accordingly, the second characteristic curve field may advantageously be used when a predetermined steering wheel rotation angle or steering wheel rotation angle range is exceeded, above which the first and the second characteristic curve fields, i.e. in particular the proportionality factors in these characteristic curve fields, are no longer different. The same applies, of course, to more than two characteristic curve fields. The steering wheel rotation angle of ±130° is only given as an example and may assume smaller or greater values.

According to an advantageous feature of the present invention, the second characteristic curve field may allow in a range up to a vehicle limit speed, in particular of 10 km/h, between two maximum steering wheel limit angles, in particular of ±300°, exclusively a position of the rear wheels in the opposite direction in relation to the position of the front wheels. Accordingly, driving in reverse based on the second characteristic curve field within the maximum steering wheel rotation limit angle occurs always with a position of the rear wheels opposite in relation to the position of the front wheels when the vehicle limit speed or a corresponding vehicle limit speed range is not exceeded. When the second characteristic curve field is used, the rear wheels are then no longer positioned in the opposite direction, in the same direction, and then again in the opposite direction in relation to the front wheels during continuous steering from a first maximum steering wheel rotation limit angle to a neutral position and continuing to a second steering wheel rotation limit angle; this significantly improves the subjective driving experience in specific driving situations.

According to another aspect of the invention, a method for steering steerable rear wheels of a motor vehicle, wherein the motor vehicle comprises front wheels which are steerable via a steering wheel and rear wheels which are automatically steerable via an actuator, includes the steps of controlling the actuator based on at least two different characteristic curve fields which relate to a steering position of the rear wheels in relation to a steering position of the front wheels and which are stored in a control device, and when driving the motor vehicle in reverse, adjusting the rear wheels by operating the actuator reversibly and continuously between a steering position of the rear wheels that is identical to the steering position of the front wheels or a steering position of the rear wheels that is opposite to the steering position of the front wheels. The control device selects one of the at least two characteristic curve fields depending on at least one parameter relating to a position or a change in the position of the steering wheel.

All descriptions relating to the motor vehicle according to the invention also apply to the method according to the invention.

Fundamentally, a characteristic curve field includes at least one proportionality factor relating to the position of the rear wheels in relation to the position of the front wheels depending on the steering wheel rotation angle and the vehicle speed. Negative values of the proportionality factor hereby indicate a position of the rear wheels in the opposite direction in relation to the front wheels, whereas positive values of the proportionality factor indicate a position of the rear wheels in the same direction in relation to the front wheels.

According to an advantageous feature of the present invention, a limit value for the temporal change of the steering wheel rotation angle and/or the temporal change of the steering wheel rotation angle velocity may be used as parameter.

According to another advantageous feature of the present invention, the control device may select a first characteristic curve field or uses a first characteristic curve field, when the steering wheel rotation angle resides in a predetermined steering wheel rotation angle range, in particular between 0°±10°, for a predetermined duration, in particular at least 1000 ms, and the steering wheel rotation angle velocity during the predetermined duration does not exceed a steering wheel rotation angle limit velocity, in particular of 100°/s.

For example, for a range up to a vehicle limit speed, in particular 10 km/h, between two maximum steering wheel rotation limit angles, in particular of ±300°, the first characteristic curve field has a transition from a negative proportionality factor indicating a position of the rear wheels opposite in relation to the position of the front wheels to a positive proportionality factor indicating a position of the rear wheels identical in relation to the position of the front wheels, and then again to a negative proportionality factor indicating a position of the rear wheels opposite in relation to the position of the front wheels. In particular, the course of the proportionality factor has up to a vehicle limit speed at least two zero crossings between the two maximum steering wheel rotation limit angles, in which the position of the rear wheels in relation to the front wheels changes from the same direction to the opposite direction or vice versa, wherein the two zero crossings are in particular at steering wheel rotation angles in a range from 95° to 135°, preferably at ±110°.

According to another advantageous feature of the present invention, the control device may select and use a second characteristic curve field when the steering wheel rotation angle is greater than a predetermined steering wheel rotation angle, in particular ±130°, above which steering wheel rotation angle the first and the second characteristic curve fields do not differ from each other. The second characteristic curve field allows, for example, in a range up to a vehicle limit speed, in particular of 10 km/h, between two maximum steering wheel limit angles, in particular of ±300°, exclusively a position of the rear wheels in the opposite direction in relation to the front wheels.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
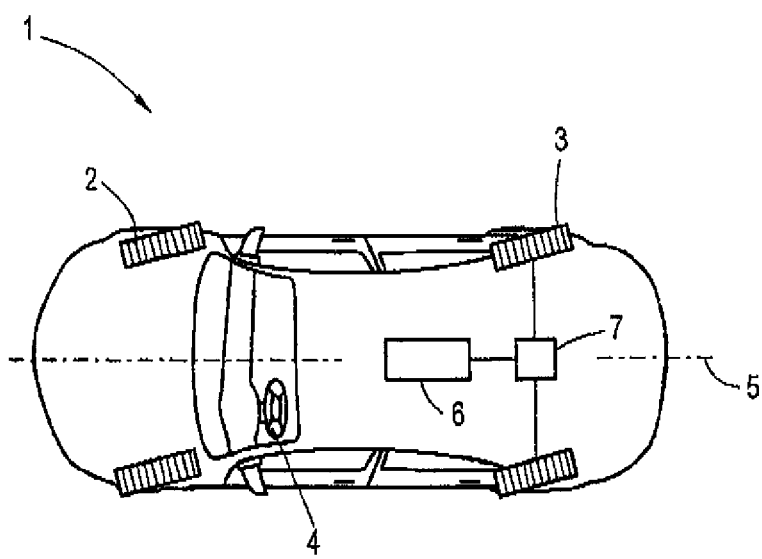
FIG. 1 shows a schematic diagram of a motor vehicle according to the present invention with front and rear wheels having excursions in the same direction.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic diagram of a motor vehicle 1 according to the invention with front wheels 2 associated with a front axle and rear wheels 3 associated with a rear axle having an excursion in the same direction. The front wheels 2 can be adjusted in a conventional manner in relation to the longitudinal axis 5 of the vehicle via a steering wheel 4. In addition, the rear wheels 3 of the motor vehicle 1 according to the invention can also be automatically steered, i.e. adjusted in relation to the longitudinal vehicle axis 5, via an actuator 7 which can be controlled by a control device 6. In other words, the rear wheels 3 can be adjusted reversibly and continuously by operating the actuator 7 when driving the motor vehicle 1 in reverse between steering positions having the same direction or opposite directions in relation to the steering position of the front wheels 2.

FIG. 1 shows the excursion of the front wheels 2 and the rear wheels 3 in the same direction. This means that the rear wheels 3 are adjusted in the same direction as the front wheels 2. Adjustment of front wheels 2 and rear wheels 3 in the same direction with the same adjustment angle allows, with respect to the longitudinal vehicle axis 5, a movement of the motor vehicle 1 along an inclined line which substantially corresponds to the orientation of the front and rear wheels 2, 3, respectively.

Figure 2:
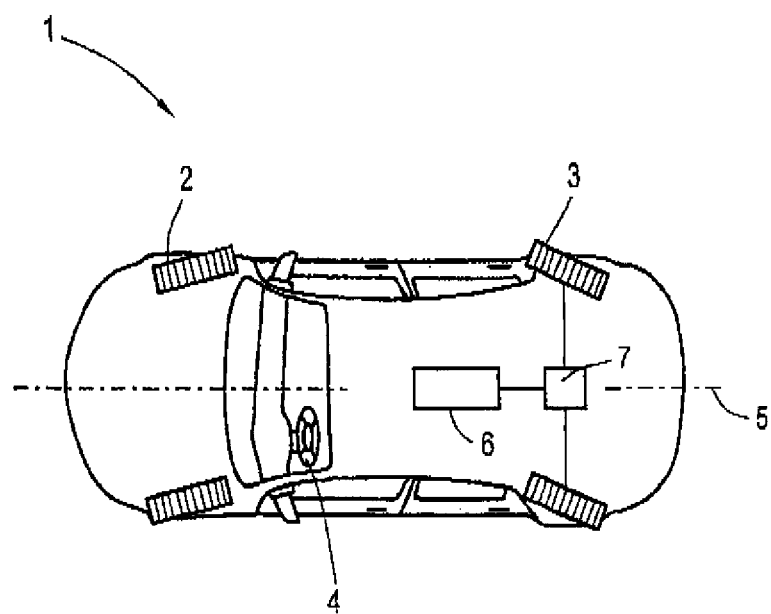
FIG. 2 shows the motor vehicle of FIG. 1 with front and rear wheels having excursions in opposite directions.

Conversely, FIG. 2 shows the motor vehicle 1 of FIG. 1 with front and rear wheels 2, 3 having excursions in opposite directions. The rear wheels 3 are hereby deflected by the actuator 7 in the opposite direction of the front wheels 2, wherein the front wheels 2 are deflected to the left, the rear wheels 3 are deflected to the right. In this situation, the motor vehicle 1 would travel along a circular path.

Figure 3:
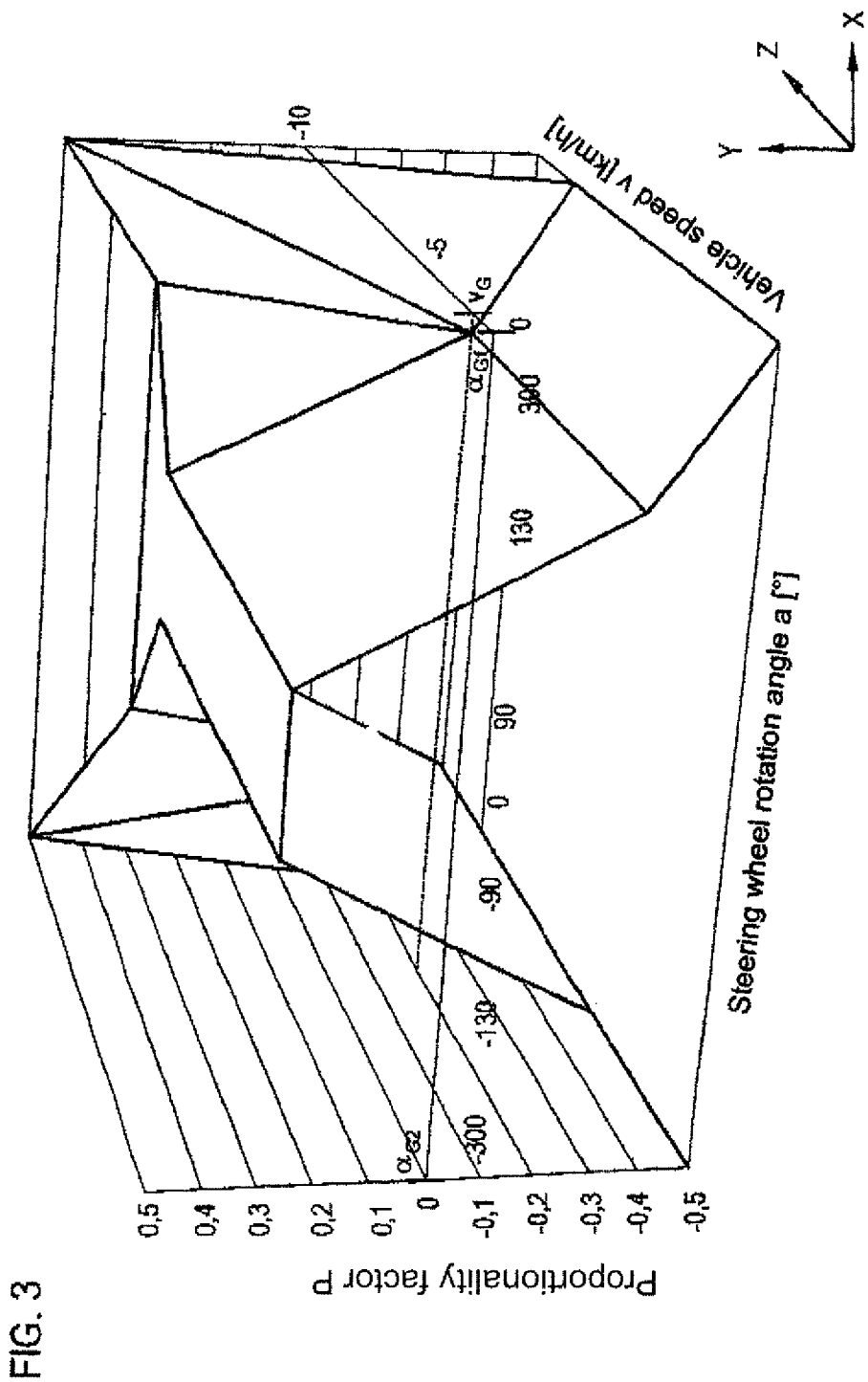
FIG. 3 shows an exemplary embodiment of a first characteristic curve field.
Figure 4:
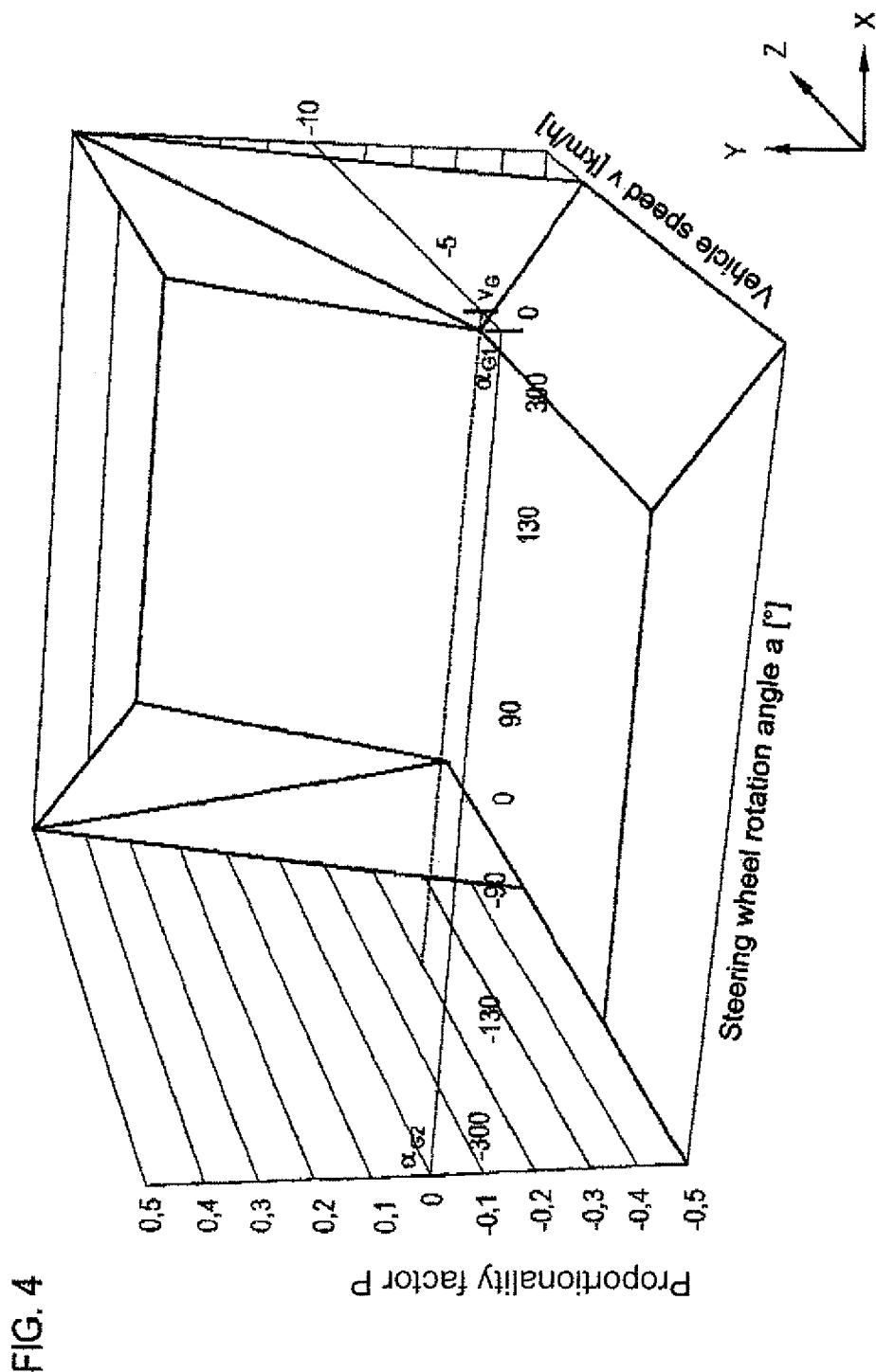
FIG. 4 shows an exemplary embodiment of a second characteristic curve field.

As mentioned above, with the actuator 7 is controlled by the control device 6 which accesses a characteristic curve field that is stored in the control device 6 and relates to the position of the rear wheels 3 in relation to the position of the front wheels 2, with the control of the actuator 7 based on the corresponding characteristic curve field. Corresponding characteristic curve fields are illustrated in FIGS. 3 and 4.

In principle, a characteristic curve field includes at least one proportionality factor P relating to the position of the rear wheels 3 in relation to the position of the front wheels 2 as a function of the steering wheel rotation angle a and the vehicle speed v. Negative values of the proportionality factor P indicate a position of the rear wheels 3 in the opposite direction in relation to a position of the front wheels 2, whereas positive values of the proportionality factor P indicate the position of the rear wheels 3 in the same direction in relation to the front wheels 2. The proportionality factor P is therefore always positive in the respective characteristic curve field for the configuration illustrated in FIG. 1 and commensurately always negative in the respective characteristic curve field for the configuration illustrated in FIG. 2.

The characteristic curve fields are to be understood as three-dimensional diagrams based on three-dimensional tables of values, which define for each defined steering wheel rotation angle a and for each vehicle speed v whether the proportionality factor P is positive, negative, or neutral, i.e. zero.

According to the invention, at least two different characteristic curve fields are stored in the control device 6. The control device 6 is configured to select a characteristic curve field depending on at least one parameter relating to the position and/or the change in position of the steering wheel. Advantageously, the parameter is a limit value for the temporal change of the steering wheel rotation angle a and/or the temporal change of the steering wheel rotation angle velocity da/dt. The steering wheel rotation angle a is to be understood as a qualitative or quantitative position of the steering wheel 4 with respect to a reference position, in particular the zero position. The steering wheel rotation angle speed da/dt represents the relative change of the steering wheel rotation angle a per unit time dt.

According to the invention, the control device 6 selects and uses for controlling the actuator 7 a first characteristic curve field shown in FIG. 3, if the steering wheel rotation angle a resides for a predetermined duration dt, in particular less than 1000 ms, in a predetermined steering wheel rotation angle range, in particular of a 0±10°, and if the steering wheel rotation angle velocity da/dt during the predetermined duration dt does not exceed a steering wheel angle limit velocity $da/dt_G$, in particular of $da/dt_G$=100°/s.

The control device 6 selects and uses a second characteristic curve field shown in FIG. 4 when the steering wheel rotation angle a is greater than a predetermined steering wheel rotation angle a, in particular a=±130°, above which steering wheel rotation angle a the first and the second characteristic curve fields do not differ from each other.

Exemplary diagrams for a first and a second characteristic curve field will now be described in more detail with reference to FIGS. 3 and 4. Shown here is a three-dimensional diagram of the proportionality factor P as a function of the steering wheel rotation angle a and the vehicle speed v (in relation to driving the motor vehicle 1 in reverse). In a Cartesian coordinate system with three mutually orthogonal axes, the upward pointing y-axis corresponds to the proportionality factor P, the x-axis pointing to the right to the steering wheel rotation angle a, and the rearward pointing z-axis to the vehicle speed v. As mentioned above, positive values of the proportionality factor P indicate the position of the rear wheels 3 in the same direction in relation to the front wheels 2, whereas negative values of the proportionality factor P indicate a position of the rear wheels 3 in the opposite direction in relation to the front wheels 2. It is evident that both characteristic curve fields are symmetric with respect to a yz-plane extending through a steering wheel rotation angle of a=0°.

As seen from FIG. 3, the first characteristic curve field provides in a range of to a vehicle limit speed $v_G$ between two maximum steering wheel rotation limit angles $a_{G1, 2}$, in particular of $a_{G1}$=300° and $a_{G2}$=−300°, for a transition from a negative proportionality factor P indicating a position of the rear wheels 3 in the opposite direction in relation to the front wheels 2 to a positive proportionality factor P indicating a position of the rear wheels 3 in the same direction in relation to the front wheels 2 and again back to a negative proportionality factor P indicating a position of the rear wheels 3 in the opposite direction in relation to the front wheels 2. This becomes evident in particular, because the proportionality factor P has two zero crossings between the two maximum steering wheel rotation limit angles $a_{G1, 2}$, of ±300° in a speed range up to the vehicle limit speed $v_G$, which is for example 7 km/h, meaning that its mathematical sign changes twice. When the proportionality factor P goes through a zero crossing, the position of the rear wheels 3 in relation to the front wheels changes from an identical direction to an opposite direction, or vice versa. The two zero crossings are located at steering wheel rotation angles a in a range from 90° to 135°, in particular at steering wheel rotation angles of a=±110°.

In contrast to the first characteristic curve field illustrated in FIG. 3, the second characteristic curve field illustrated in FIG. 4 provides in the range of to a vehicle limit speed $v_G$, which may also be about 7 km/h, exclusively for a position of the rear wheels 3 in relation to the front wheels 2 in the same direction between the two maximum steering wheel rotation limit angles $a_{G1, 2}$ in particular of $a_{G1}$=±300°. This is evident from the always negative values of the proportionality factor P in this range. Accordingly, the proportionality factor P does not have two zero crossings when steering from one limit to the other limit, meaning when adjusting the steering wheel 4 from its left maximum excursion, which corresponds to the steering wheel rotation limit angle $a_{G2}$ of −300°, to its right maximum excursion, which corresponds to the steering wheel rotation limit angle $a_{G1}$ of +300°. The position of the rear wheels 3 in relation to the front wheels 2 remains in the same direction as long as the vehicle limit speed $v_G$ is not exceeded.

Expressed with reference to the geometric shape of the respective characteristic curve fields, the second characteristic curve field has in the range up to the vehicle limit speed $v_G$ no trapezoidal plateau above the zero crossing through the proportionality factor P. The proportionality factor P becomes positive only above the vehicle limit speed $v_G$, independent of the steering wheel rotation angle a.

The principle according to the invention therefore solves the problem of the occurrence of a noticeable "flutter" of the rear wheels 3 when steering between the two maximum steering wheel rotation limit angles $a_{G1, 2}$ at a constant low vehicle speed v below the respective vehicle limit speed $v_G$, when the position of the front wheels 2 changes from the opposite direction to the same direction and then back again to the opposite direction (see the two zero crossings of the proportionality factor P in the first characteristic curve field illustrated in FIG. 3). Control of the actuator 7 can then be based on the second characteristic curve field illustrated in FIG. 4, which does not provide for a zero crossing of the proportionality factor P below the vehicle limit speed $v_G$.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A motor vehicle, comprising:
a steering wheel for steering front wheels of the motor vehicle,
an actuator for automatically steering rear wheels of the motor vehicle, and
a control device storing at least two different characteristic curve fields relating to a position of the rear wheels in relation to a position of the front wheels for controlling the actuator, wherein the at least two characteristic curve fields differs from each other below a predetermined steering wheel rotation angle and the at least two characteristic curve fields do not differ from each other above the predetermined steering wheel rotation angle, wherein the control device is configured to select one of the at least two characteristic curve fields depending on at least one parameter relating to a position of the steering wheel or a change in position of the steering wheel, to select and use a first of the at least two characteristic curve fields, when for a predetermined duration the steering wheel rotation angle resides in a predetermined steering wheel rotation angle range for a predetermined duration and when a steering wheel rotation angle velocity does not exceed a steering wheel rotation angle limit velocity during the predetermined duration, and to select and use a second of the at least two characteristic curve fields, when the steering wheel rotation angle is greater than the predetermined steering wheel rotation angle, wherein, when driving the motor vehicle in reverse, the actuator reversibly and continuously adjusts the rear wheels commensurate with the selected characteristic curve field between a steering position that is identical to a steering position of the front wheels or a steering position that is opposite to the steering position of the front wheels.

2. The motor vehicle of claim 1, wherein the at least one parameter is a limit value for a temporal change of the steering wheel rotation angle or for a temporal change of the steering wheel rotation angle velocity.

3. The motor vehicle of claim 1, wherein the predetermined duration is at least 1000 ms.

4. The motor vehicle of claim 1, wherein the predetermined steering wheel rotation angle range is between 0°±10°.

5. The motor vehicle of claim 1, wherein the steering wheel rotation angle limit velocity is 100°/s.

6. The motor vehicle of claim 1, wherein the predetermined steering wheel rotation angle is ±130°.

7. The motor vehicle of claim 1, wherein a characteristic curve field has at least one proportionality factor relating to the position of the rear wheels in relation to the position of the front wheels as a function of a steering wheel rotation angle and a vehicle speed, wherein a negative value of the at least one proportionality factor indicates that the steering position of the rear wheels is opposite in relation to the steering position of the front wheels and a positive value of the at least one proportionality factor indicates that the steering position of the rear wheels is identical in relation to the steering position of the front wheels.

8. The motor vehicle of claim 7, wherein in a range up to a vehicle limit speed, a first characteristic curve field comprises between two maximum steering wheel rotation limit angles a transition from a negative proportionality factor indicating that the steering position of the rear wheels is opposite in relation to the steering position of the front wheels to a positive proportionality factor indicating that the steering position of the rear wheels is identical in relation to the steering position of the front wheels, and again to a negative proportionality factor indicating that the steering position of the rear wheels is opposite in relation to the steering position of the front wheels.

9. The motor vehicle of claim 8, wherein the vehicle limit speed is 10 km/h.

10. The motor vehicle of claim 8, wherein the maximum steering wheel rotation limit angles are ±300°.

11. The motor vehicle of claim 8, wherein a course of the proportionality factor has up to the vehicle limit speed at least two zero crossings between the two maximum steering wheel rotation limit angles, wherein the steering position of the rear wheels in relation to the steering position of the front wheels changes at the at least two zero crossings from an identical steering direction to an opposite steering direction, or vice versa, wherein the at least two zero crossings are located at steering wheel rotation angles in a range from 90° to 135°.

12. The motor vehicle of claim 11, wherein the at least two zero crossings are located at steering wheel rotation angles of ±110°.

13. The motor vehicle of claim 7, wherein a second characteristic curve field comprises in a range up to a vehicle limit speed between two maximum steering wheel limit angles exclusively a steering position of the rear wheels in the opposite direction in relation to the steering position of the front wheels.

14. The motor vehicle of claim 13, wherein the vehicle limit speed is 10 km/h.

15. The motor vehicle of claim 13, wherein the maximum steering wheel limit angles are ±300°.

16. A method for steering steerable rear wheels of a motor vehicle, wherein the motor vehicle comprises front wheels which are steerable via a steering wheel and rear wheels which are automatically steerable via an actuator, comprising the steps of:

controlling the actuator based on at least two different characteristic curve fields which relate to a steering position of the rear wheels in relation to a steering position of the front wheels and which are stored in a control device, wherein the at least two characteristic curve fields differs from each other below a predetermined steering wheel rotation angle and the at least two characteristic curve fields do not differ from each other above the predetermined steering wheel rotation angle, wherein the control device selects one of the at least two characteristic curve fields depending on at least one parameter relating to a position or a change in the position of the steering wheel, wherein the control device selects and uses a first of the at least two characteristic curve fields, when the steering wheel rotation angle resides in a predetermined steering wheel rotation angle range for a predetermined duration and when a steering wheel rotation angle velocity does not exceed a steering wheel rotation angle limit velocity during the predetermined duration, and wherein the control device selects and uses a second of the at least two characteristic curve fields, when the steering wheel rotation angle is greater than a predetermined steering wheel rotation angle, and when driving the motor vehicle in reverse, adjusting the rear wheels commensurate with the selected characteristic curve field by operating the actuator reversibly and continuously between a steering position of the rear wheels that is identical to the steering position of the front wheels or a steering position of the rear wheels that is opposite to the steering position of the front wheels.

17. The method of claim 16, wherein the at least one parameter is a limit value for a temporal change of the steering wheel rotation angle or a temporal change of the steering wheel rotation angle velocity.

18. The method of claim 16, wherein the predetermined duration is at least 1000 ms.

19. The method of claim 16, wherein the predetermined steering wheel rotation angle range is 0°±10°.

20. The method of claim 16, wherein the steering wheel rotation angle limit velocity is 100°/s.

21. The method of claim 16, wherein the predetermined steering wheel rotation angle is ±130°.

22. The method of claim 16, wherein the used first or second characteristic curve field includes at least one proportionality factor relating to the steering position of the rear wheels in relation to the steering position of the front wheels as a function of the steering wheel rotation angle and a vehicle speed, wherein negative values of the at least one proportionality factor indicate that the steering position of the rear wheels is opposite in relation to the steering position of the front wheels and positive values of the at least one proportionality factor indicate that the steering position of the rear wheels is identical in relation to the steering position of the front wheels.

23. The method of claim 22, wherein when the first characteristic curve field is used in a range up to a vehicle limit speed between two maximum steering wheel rotation limit angles, the at least one proportionality factor transitions from a negative proportionality factor indicating that the steering position of the rear wheels opposite in relation to the steering position of the front wheels to a positive proportionality factor indicating that the steering position of the rear wheels is identical in relation to the steering position of the front wheels, and thereafter again to a negative proportionality factor indicating that the steering position of the rear wheels is opposite in relation to the steering position of the front wheels.

24. The method of claim 23, wherein the vehicle limit speed is 10 km/h.

25. The method of claim 23, wherein the maximum steering wheel rotation limit angles are ±300°.

26. The method of claim 22, wherein when the second characteristic curve field is used in a range up to a vehicle limit speed between two maximum steering wheel limit angles, the steering position of the rear wheels is exclusively opposite in relation to the steering position of the front wheels.

27. The method of claim 23, wherein the vehicle limit speed is 10 km/h.

28. The method of claim 26, wherein the maximum steering wheel rotation limit angles are ±3000.

* * * * *